(12) United States Patent
Chen et al.

(10) Patent No.: US 12,344,906 B2
(45) Date of Patent: Jul. 1, 2025

(54) SYSTEM AND METHOD FOR REDUCING CONTENT OF 5-HYDROXYMETHYLFURFURAL IN HIGH FRUCTOSE CORN SYRUP

(71) Applicant: Zhejiang Huakang Pharmaceutical Co., Ltd., Zhejiang (CN)

(72) Inventors: Shengrong Chen, Zhejiang (CN); Jun Zhuge, Zhejiang (CN); Yuqing Cheng, Zhejiang (CN); Xinfeng Han, Zhejiang (CN); Jiaxing Luo, Zhejiang (CN)

(73) Assignee: Zhejiang Huakang Pharmaceutical Co., Ltd., Quzhou (CN)

( * ) Notice: Subject to any disclaimer, the term of this patent is extended or adjusted under 35 U.S.C. 154(b) by 413 days.

(21) Appl. No.: 17/775,002

(22) PCT Filed: Feb. 7, 2021

(86) PCT No.: PCT/CN2021/075695
§ 371 (c)(1),
(2) Date: May 6, 2022

(87) PCT Pub. No.: WO2021/160053
PCT Pub. Date: Aug. 19, 2021

(65) Prior Publication Data
US 2022/0389526 A1 Dec. 8, 2022

(30) Foreign Application Priority Data
Feb. 11, 2020 (CN) .......................... 202010087317.9

(51) Int. Cl.
*C13K 1/08* (2006.01)
*B01J 47/028* (2017.01)
*B01J 47/04* (2006.01)

(52) U.S. Cl.
CPC ............... *C13K 1/08* (2013.01); *B01J 47/028* (2013.01); *B01J 47/04* (2013.01)

(58) Field of Classification Search
CPC . C13K 1/08; B01J 47/028; B01J 47/04; B01J 47/026; Y02P 20/10
See application file for complete search history.

(56) References Cited

U.S. PATENT DOCUMENTS 5,932,015 A    8/1999  Yoneda et al.
8,097,086 B2   1/2012  Lapoujade et al.

FOREIGN PATENT DOCUMENTS

CN    102876758 A      1/2013
CN    103409484       11/2013
(Continued)

OTHER PUBLICATIONS

International Search Report in International Appln. No. PCT/CN2021/075694, dated Apr. 28, 2021, 3 pages.
(Continued)

*Primary Examiner* — Daniel C. McCracken
*Assistant Examiner* — Joshua Maxwell Speer
(74) *Attorney, Agent, or Firm* — Fish & Richardson P.C.

(57) ABSTRACT

The present invention relates to a system for reducing a content of 5-hydroxymethylfurfural in a high fructose syrup, including an ion exchange positive column and an ion exchange negative column for performing cation and anion removals in sequence for an F42 high fructose syrup obtained by performing isomerization and first decolorization, a heat exchanger for performing heat exchange and temperature reduction for an F55 high fructose syrup obtained by performing concentration, chromatographic separation, blending and second decolorization in sequence for the F42 high fructose syrup subjected to ion exchange, a mixed bed column for performing purification for the
(Continued)

heat-exchanged F55 high fructose syrup, and an evaporation tank for performing concentration for the F55 high fructose syrup subjected to mixed bed treatment. The present invention further provides a method of reducing a content of 5-hydroxymethylfurfural in a high fructose syrup. In the present invention, optimization is performed for ion exchange and operation modes and parameters of the mixed bed such that the HMF content in the high fructose syrup product is reduced in a case of ensuring the quality of the high fructose syrup product, thus improving the quality of the high fructose syrup product.

9 Claims, 1 Drawing Sheet

(56) References Cited

FOREIGN PATENT DOCUMENTS

| | | |
|---|---|---|
| CN | 104177229 | 12/2014 |
| CN | 104450799 | 3/2015 |
| CN | 104498639 A | 4/2015 |
| CN | 204710317 U | 10/2015 |
| CN | 105316374 A | 2/2016 |
| CN | 105561894 | 5/2016 |
| CN | 205512099 U | 8/2016 |
| CN | 107058428 A | 8/2017 |
| CN | 206478858 U | 9/2017 |
| CN | 109136302 A | 1/2019 |
| CN | 109402191 A * | 3/2019 |
| CN | 111206056 | 5/2020 |
| CN | 211848008 U | 11/2020 |
| JP | S50-005544 A | 1/1975 |
| JP | S56-148300 A | 11/1981 |
| JP | S57-047499 A | 3/1982 |
| JP | S62-079800 A | 4/1987 |
| JP | 2001-061499 A | 3/2001 |
| JP | 2010-517522 A | 5/2010 |
| JP | 2014-042498 A | 3/2014 |

OTHER PUBLICATIONS

Kehong, "Biotransformation of Inulin and Cassava Starch into High Titer Sorbitol and Gluconic Acid basic Sciences," China Master's Theses, Dec. 2013, S1(15):58 pages (with English abstract).
Office Action in Chinese Appln. No. 202010087372.8, dated Jun. 22, 2021, 10 pages (with English translation).
Office Action in Chinese Appln. No. 202010087317.9, dated Nov. 25, 2023, 20 pages (with English translation).
Office Action in Japanese Appln. No. 2022-524000, dated Sep. 6, 2023, 5 pages (with English translation).

* cited by examiner

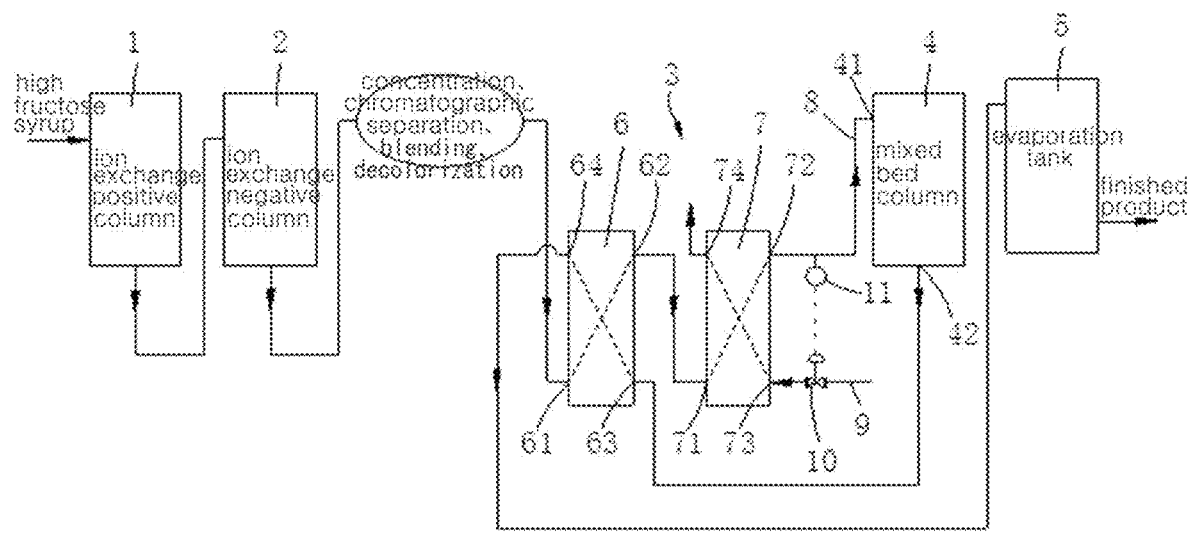

US 12,344,906 B2

SYSTEM AND METHOD FOR REDUCING CONTENT OF 5-HYDROXYMETHYLFURFURAL IN HIGH FRUCTOSE CORN SYRUP

CROSS REFERENCE TO RELATED APPLICATIONS

This application is a U.S. national phase filing under 35 U.S.C. § 371 of International Application No. PCT/CN2021/075695, filed Feb. 7, 2021, which claims priority from Chinese Application No. 202010087317.9, filed Feb. 11, 2020. The contents of the prior applications are incorporated herein by reference in their entirety.

TECHNICAL FIELD

The present invention relates to the field of high fructose syrup preparation technologies, and in particular to a system and a method for reducing a content of 5-hydroxymethylfurfural in a high fructose syrup.

BACKGROUND

High fructose syrup is an important sweetener which is mainly manufactured with corn starch as raw material. The sweetener consists of fructose and glucose. In a current production process, starch is converted into glucose through liquefaction and saccharification, the glucose is isomerized into an F42 high fructose syrup, the F42 high fructose syrup is subjected to decolorization, ion exchange and concentration and then partially brought into chromatographic separation to obtain an F90 high fructose syrup, the F42 high fructose syrup is blended with the F90 high fructose syrup to form an F55 high fructose syrup, and the F55 high fructose syrup is subjected to decolorization, mixed bed treatment and concentration to obtain a finished F55 high fructose syrup with a mass concentration of 77%.

In a high fructose syrup production process, glucose and fructose are dehydrated to produce 5-hydroxymethylfurfural (HMF) which is harmful to striated muscle and internal organs of a human body and has poor stability. In a high fructose syrup storage process, polymerization reaction may occur especially under high temperature conditions, such that the product becomes yellow, thus affecting the service life of the product. As a result, it is preferred that the product contains less HMF. Although GB/T 20882-2007 has no requirement for the content of HMF, some enterprises purchasing high fructose syrup clearly require that the HMF content in the product should be ≤75 ppm.

At present, in the methods of reducing HMF in a high fructose syrup, a semi-finished product removal method is usually adopted so as to finally obtain a finished product by concentration. For example, a patent with a publication number CN102326728A discloses a method of removing 5-hydroxymethylfurfural in a high fructose syrup, where a semi-finished high fructose syrup firstly undergoes material liquid pre-treatment (controlling chromaticity to below 30 RBU), and then adsorbed with an anion exchange resin until the HMF content is less than 5 mg/kg, and then controlled through cation and anion exchange to have a conductivity of 5 μs/cm and a pH value of 3-8, and then decolorized to control its chromaticity to be less than SRBU and its transmittance to be greater than 99%, and finally concentrated to a finished high fructose syrup with a mass ratio of 75-78%. However, this method is to perform re-treatment for a prepared high fructose syrup, thus increasing working procedures and costs.

SUMMARY

In order to solve the above technical problems, the present invention provides a system and a method for reducing a content of 5-hydroxymethylfurfural in a high fructose syrup. In a preparation process of a high fructose syrup, with a content of 5-hydroxymethylfurfural (HMF) as an index, optimization is performed for ion exchange and operation modes and parameters of a mixed bed such that the HMF content in the high fructose syrup product is reduced in a case of ensuring the quality of the high fructose syrup product, thus improving the quality of the high fructose syrup product.

The present invention is achieved in the following manner: there is provided a system for reducing a content of 5-hydroxymethylfurfural in a high fructose syrup, including an ion exchange positive column and an ion exchange negative column for performing cation and anion removals in sequence for an F42 high fructose syrup obtained by performing isomerization and first decolorization; a heat exchanger for performing heat exchange and temperature reduction for an F55 high fructose syrup obtained by performing concentration, chromatographic separation, blending and second decolorization in sequence for the F42 high fructose syrup subjected to ion exchange; a mixed bed column for performing purification for the heat-exchanged F55 high fructose syrup; and an evaporation tank for performing concentration for the F55 high fructose syrup subjected to mixed bed treatment.

In a production process of preparing a high fructose syrup, glucose and fructose, especially the fructose, are easily converted into HMF under low pH and high temperature. In the ion exchange positive column, after cations in the high fructose syrup are exchanged with $H^+$ ions, the material has a pH value of 2-3 to show acidity and has a temperature of 55-58° C. Under these conditions, more fructose may be converted into HMF. Furthermore, HMF will change into a colored substance under high temperature, affecting adsorption of a mixed bed resin for HMF or the like. In the present invention, in order to reduce the HMF content in the high fructose syrup, various production procedures are analyzed to determine significant impact from ion exchange and mixed bed procedures. In a case of ensuring the discharge liquid of the ion exchange is qualified in index, the ion exchange is changed from a double group operation mode of positive column-negative column-positive column-negative column into a single group operation mode of positive column-negative column, such that the operation time of the high fructose syrup in the positive column is reduced by half, thereby effectively reducing generation of HMF. Further, with additional heat exchange procedure, a feed temperature of the mixed bed column is reduced to prevent HMF in the high fructose syrup from changing into a colored substance due to high temperature, thereby improving the adsorption of the mixed bed resin for HMF and further reducing the HMF content in the high fructose syrup.

The present invention is achieved in the following manner: there is provided a method of reducing a content of 5-hydroxymethylfurfural in a high fructose syrup, which includes the following steps:

at step 1, obtaining a glucose syrup with a glucose content of 95.5-96.5% by performing liquefaction, saccharification and refining for starch;

at step 2, mixing the glucose syrup in step 1 with a raffinate in step 6 and concentrating the mixture to obtain a glucose syrup solution with a refractive index of 42-45%;

at step 3, adjusting the glucose syrup solution in step 2 to a temperature of 56-58° C. and a pH value of 7.7-7.9 and then bringing the glucose syrup solution into an isomerization column to obtain an F42 high fructose syrup;

at step 4, decolorizing the F42 high fructose syrup in step 3 and then bringing the F42 high fructose syrup into an ion exchange positive column and an ion exchange negative column in sequence to remove cations and anions so as to obtain a refined F42 high fructose syrup;

at step 5, concentrating the refined F42 high fructose syrup in step 4 to obtain a finished F42 high fructose syrup;

at step 6, bringing about 42-50% of the finished F42 high fructose syrup in step 5 into chromatographic separation to obtain an F90 high fructose syrup extract liquid with a fructose content of 90% and a raffinate with a glucose content of 80-85%, wherein the raffinate is reused in step 2;

at step 7, blending the F90 high fructose syrup extract liquid in step 6 with a part of the finished F42 high fructose syrup in step 5 to obtain an F55 high fructose syrup;

at step 8, decolorizing the F55 high fructose syrup in step 7 and then bringing the F55 high fructose syrup into a mixed bed column so as to obtain a refined F55 high fructose syrup; wherein, in order to increase a feed temperature of an evaporation tank in step 9, a 2-level heat exchange manner of enabling the F55 high fructose syrup to carry out heat exchange with a discharge of the mixed bed column and then carry out heat exchange with cooling water before the F55 high fructose syrup enters the mixed bed column is adopted, a regulating valve is disposed on a cooling water inlet pipe of a second heat exchanger, a thermometer is disposed on a discharge pipe of the second heat exchanger in communication with the mixed bed column, and the regulating valve and the outlet thermometer are interlocked;

at step 9, performing evaporation concentration for the refined F55 high fructose syrup in step 8 to obtain a finished F55 high fructose syrup.

Compared with the prior art, the system and method for reducing a content of 5-hydroxymethylfurfural in a high fructose syrup in the present invention have the following advantages.

1. The operational column pressure of the ion exchange column is reduced by 0.2 MPa, lowering a resin breakage rate.

2. The feed temperature of the mixed bed column is reduced to ≤38° C., HMF is effectively controlled, and the exchange capacity is increased by 15-25%.

3. The unit consumptions of acid-base, the unit consumption of purified water and the wastewater treatment costs and the like are entirely reduced by 2-6%.

4. No equipment is added and no impact is brought to the production efficiency.

5. The content of 5-hydroxymethylfurfural in the high fructose syrup is reduced by 35-45%, improving the quality of the high fructose syrup product.

BRIEF DESCRIPTION OF THE DRAWINGS

FIG. 1 is a schematic diagram illustrating a structural principle of a system for reducing a content of 5-hydroxymethylfurfural in a high fructose syrup according to one or more embodiments of the present invention.

DETAILED DESCRIPTION OF THE EMBODIMENTS

In order to make the technical problems, the technical solutions and the beneficial effects of the present invention clearer and more understandable, the present invention will be further described below in combination with the accompanying drawings and specific embodiments. It should be understood that the specific embodiments described herein are merely used to explain the present invention rather than limit the present invention.

FIG. 1 shows a preferred embodiment of a system for reducing a content of 5-hydroxymethylfurfural in a high fructose syrup according to the present invention. The system includes an ion exchange positive column 1 and an ion exchange negative column 2 for performing cation and anion removals in sequence for an F42 high fructose syrup obtained by performing isomerization and first decolorization, a heat exchanger 3 for performing heat exchange and temperature reduction for an F55 high fructose syrup obtained by performing concentration, chromatographic separation, blending and second decolorization in sequence for the F42 high fructose syrup subjected to ion exchange, a mixed bed column 4 for performing purification for the heat-exchanged F55 high fructose syrup, and an evaporation tank 5 for performing concentration for the F55 high fructose syrup subjected to mixed bed treatment. The bottom of the evaporation tank 5 is provided with an outlet for a finished F55 high fructose syrup.

The heat exchanger 3 includes a first heat exchanger 6 and a second heat exchanger 7 connected in series. The first heat exchanger 6 and the second heat exchanger 7 include a first inlet, a second inlet, a first outlet and a second outlet respectively.

As shown by arrows in the drawing, the F55 high fructose syrup enters the first heat exchanger 6 through the first inlet 61 of the first heat exchanger 6 and then goes out of the first outlet 62 of the first heat exchanger 6, and then enters the second heat exchanger 7 through the first inlet 71 of the second heat exchanger 7 and then goes out of the first outlet 72 of the second heat exchanger 7 and then enters a liquid inlet 41 of the mixed bed column 4 through a liquid inlet pipe 8.

The F55 high fructose syrup purified by the mixed bed column 4 enters a second inlet 63 of the first heat exchanger 6 through an outlet 42 of the mixed bed column 4, and then goes out of the second outlet 64 of the first heat exchanger 6 and then enters a liquid inlet 51 of the evaporation tank 5. The second inlet 73 of the second heat exchanger 7 is in communication with cooling water through a water inlet pipe 9, and the heat-exchanged cooling water goes out of the second outlet 74 of the second heat exchanger 7.

A regulating valve 10 is disposed on the water inlet pipe 9 and a thermometer 11 is disposed on the liquid inlet pipe 8. The regulating valve 10 and the thermometer 11 are interlocked. The regulating valve 10 automatically regulates an openness of the regulating valve based on a temperature of the thermometer 11.

The present invention further discloses a method of reducing a content of 5-hydroxymethylfurfural in a high fructose syrup. The method includes the following steps.

At step 1, a glucose syrup with a glucose content of 95.5-96.5% is obtained by performing liquefaction, saccharification and refining for starch.

At step 2, the glucose syrup in step 1 is mixed with a raffinate in step 6 and then concentrated to obtain a glucose syrup solution with a refractive index of 42-45%.

At step 3, the glucose syrup solution in step 2 is adjusted to a temperature of 56-58° C. and a pH value of 7.7-7.9 and then brought into an isomerization column to obtain an F42 high fructose syrup with a fructose content of 42-45%.

At step 4, the F42 high fructose syrup in step 3 is decolorized and then brought into an ion exchange positive column and an ion exchange negative column in sequence as shown by arrows in the drawing to remove cations and anions so as to obtain a refined F42 high fructose syrup; where a discharge of the refined F42 high fructose syrup has a pH value of 3.5-8.0 and a conductivity of ≤30 us/cm.

At step 5, the refined F42 high fructose syrup in step 4 is concentrated to obtain a finished F42 high fructose syrup with a refractive index of 58-60%.

At step 6, about 42-50% of the finished F42 high fructose syrup in step 5 is brought into chromatographic separation to obtain an F90 high fructose syrup extract liquid with a fructose content of 90% and a raffinate with a glucose content of 80-85%, where the raffinate is reused in step 2.

At step 7, the F90 high fructose syrup extract liquid in step 6 is blended with a part of the finished F42 high fructose syrup in step 5 to obtain an F55 high fructose syrup with a fructose content of 55-57%.

At step 8, the F55 high fructose syrup in step 7 is decolorized and then brought into a mixed bed column so as to obtain a refined F55 high fructose syrup; where, in order to increase a feed temperature of an evaporation tank in step 9, a 2-level heat exchange manner of enabling the F55 high fructose syrup to carry out heat exchange with a discharge of the mixed bed column and then carry out heat exchange with cooling water before the F55 high fructose syrup enters the mixed bed column is adopted, a regulating valve is disposed on a cooling water inlet pipe of a second heat exchanger, a thermometer is disposed on a discharge pipe of the second heat exchanger in communication with the mixed bed column, and the regulating valve and the outlet thermometer are interlocked; the second heat exchanger is controlled to have a discharge temperature of 35-38° C., a discharge pH value of 4.0-7.0 and a conductivity ≤20 μs/cm, IU≤10.

At step 9, evaporation concentration is performed for the refined F55 high fructose syrup in step 8 to obtain a finished F55 high fructose syrup with solid content of above 77%.

The method of reducing a content of 5-hydroxymethylfurfural in a high fructose syrup according to the present invention will be further described below in combination with specific embodiments.

Embodiment 1

In the first embodiment of the present invention, the method of reducing a content of 5-hydroxymethylfurfural (HMF) in a high fructose syrup includes the following steps.

(11) Glucose syrup was isomerized to obtain an F42 high fructose syrup with a temperature of 57-58° C. and a fructose content of 44-44.5%, where the HMF content was 14 ppm.

(12) The F42 high fructose syrup in step (11) was decolorized and then brought into the ion exchange positive column and the ion exchange negative column in sequence to obtain a refined F42 high fructose syrup, where an operation time of the F42 high fructose syrup in the ion exchange positive column was about 10 min, a discharge after ion exchange had a pH value of 3.5 and a conductivity of 25 μs/cm, and the HMF content was 25 ppm.

(13) The refined F42 high fructose syrup in step (12) was subjected to concentration, chromatographic separation and blending and then decolorized by activated charcoal and then brought into the mixed bed column to obtain a refined F55 high fructose syrup. Before entering the mixed bed column, the refined F42 high fructose syrup firstly performed heat exchange with a discharge of the mixed bed column and then performed heat exchange with cooling water, a temperature of the high fructose syrup entering the mixed bed column was 35-36° C., a discharge of the mixed bed column had a pH value of 4.0-4.5 and a conductivity of ≤2 μs/cm, IU=2.0, where the HMF content was 14 ppm.

(14) The refined F55 high fructose syrup in step (13) was evaporated and concentrated to obtain a finished F55 high fructose syrup with a solid content of above 77%, where the HMF content was 23 ppm, IU=3.2, pH3.8.

Embodiment 2

In the second embodiment of the present invention, the method of reducing a content of 5-hydroxymethylfurfural (HMF) in a high fructose syrup includes the following steps.

(21) Glucose syrup was isomerized to obtain an F42 high fructose syrup with a temperature of 56-57° C. and a fructose content of 42-42.5%, where the HMF content was 13 ppm.

(22) The F42 high fructose syrup in step (21) was decolorized and then brought into the ion exchange positive column and the ion exchange negative column in sequence to obtain a refined F42 high fructose syrup, where an operation time of the F42 high fructose syrup in the ion exchange positive column was about 10 min, a discharge after ion exchange had a pH value of 8.0 and a conductivity of 30 μs/cm, and the HMF content was 20 ppm.

(23) The refined F42 high fructose syrup in step (22) was subjected to concentration, chromatographic separation and blending and then decolorized by activated charcoal and then brought into the mixed bed column to obtain a refined F55 high fructose syrup. Before entering the mixed bed column, the refined F42 high fructose syrup firstly performed heat exchange with a discharge of the mixed bed column and then performed heat exchange with cooling water, a temperature of the high fructose syrup entering the mixed bed column was 36-37° C., a discharge of the mixed bed column had a pH value of 6.5-7.0 and a conductivity of ≤12 μs/cm, IU=5.0, where the HMF content was 13 ppm.

(24) The refined F55 high fructose syrup in step (23) was evaporated and concentrated to obtain a finished F55 high fructose syrup with a solid content of above 77%, where the HMF content was 22 ppm, IU=5.2, pH6.3.

Embodiment 3

In the third embodiment of the present invention, the method of reducing a content of 5-hydroxymethylfurfural (HMF) in a high fructose syrup includes the following steps.

(31) Glucose syrup was isomerized to obtain an F42 high fructose syrup with a temperature of 57-58° C. and a fructose content of 43-43.5%, where the HMF content was 14 ppm.

(32) The F42 high fructose syrup in step (31) was decolorized and then brought into the ion exchange positive column and the ion exchange negative column in sequence to obtain a refined F42 high fructose syrup, where an operation time of the F42 high fructose syrup in the ion exchange positive column was about 10 min, a discharge after ion exchange had a pH value of 6.5 and a conductivity of 20 μs/cm, and the HMF content was 24 ppm.

(33) The refined F42 high fructose syrup in step (32) was subjected to concentration, chromatographic separation and blending and then decolorized by activated charcoal and then brought into the mixed bed column to obtain a refined F55 high fructose syrup. Before entering the mixed bed column, the refined F42 high fructose syrup firstly performed heat exchange with a discharge of the mixed bed column and then performed heat exchange with cooling water, a temperature of the high fructose syrup entering the mixed bed column was 37-38° C., a discharge of the mixed bed column had a pH value of 5.5-6.0 and a conductivity of ≤15 μs/cm, IU=10.0, where the HMF content was 16 ppm.

(34) The refined F55 high fructose syrup in step (33) was evaporated and concentrated to obtain a finished F55 high fructose syrup with a solid content of above 77%, where the HMF content was 23 ppm, IU=3.2, pH3.8.

Control Embodiment

A first control embodiment of the present disclosure includes the following steps.

(41) Glucose syrup was isomerized to obtain an F42 high fructose syrup with a temperature of 57-58° C. and a fructose content of 44-44.5%, where the HMF content was 14 ppm.

(42) The F42 high fructose syrup in step (41) was decolorized and then brought into the ion exchange positive column, the ion exchange negative column, the ion exchange positive column and the ion exchange negative column in sequence to obtain a refined F42 high fructose syrup, where an operation time of the F42 high fructose syrup in the ion exchange positive columns was 20 min, a discharge after ion exchange had a pH value of 3.6 and a conductivity of 25 μs/cm, and the HMF content was 49 ppm.

(43) The refined F42 high fructose syrup in step (42) was subjected to concentration, chromatographic separation and blending and then decolorized by activated charcoal and then brought into the mixed bed column to obtain a refined F55 high fructose syrup. A temperature of the high fructose syrup entering the mixed bed column was 58° C., a discharge of the mixed bed column had a pH value of 4.2-4.5 and a conductivity of ≤2 μs/cm, IU=2.5, where the HMF content was 35 ppm.

(44) The refined F55 high fructose syrup in step (43) was evaporated and concentrated to obtain a finished F55 high fructose syrup with a solid content of above 77%, where the HMF content was 56 ppm, IU=4.0, pH3.9.

It can be seen from the control embodiment that the method of preparing a high fructose syrup in the present invention can effectively reduce the content of 5-hydroxymethylfurfural (HMF) in the high fructose syrup, resulting in obvious effect.

The above descriptions are merely made to those preferred embodiments of the present invention and shall not be intended to limit the present invention. Any changes, equivalent substitutions and improvements made within the spirit and principle of the present invention shall all fall within the scope of protection of the present invention.

The invention claimed is:

1. A system for reducing a content of 5-hydroxymethylfurfural in a high fructose syrup, comprising:
    an ion exchange positive column and an ion exchange negative column for removing cations and anions from an F42 high fructose syrup;
    a heat exchanger unit for reducing the temperature of an F55 high fructose syrup obtained from the F42 high fructose syrup to obtain a heat-exchanged F55 high fructose syrup;
    a mixed bed column for purifying the heat-exchanged F55 high fructose syrup to obtain a purified F55 high fructose syrup; and
    an evaporation tank for concentrating the purified F55 high fructose syrup,
    wherein the heat exchanger unit comprises a first heat exchanger and a second heat exchanger connected in series,
    the first heat exchanger comprises a first inlet, a second inlet, a first outlet, and a second outlet,
    the second heat exchanger comprises a first inlet, a second inlet, a first outlet, and a second outlet,
    the heat exchanger unit is configured to allow the F55 high fructose syrup to enter the first heat exchanger through the first inlet of the first heat exchanger, exit the first outlet of the first heat exchanger, enter the second heat exchanger through the first inlet of the second heat exchanger, exit the first outlet of the second heat exchanger, and enter a liquid inlet of the mixed bed column through a liquid inlet pipe, and
    the heat exchanger unit is further configured to allow the F55 high fructose syrup purified by the mixed bed column to enter the second inlet of the first heat exchanger through an outlet of the mixed bed column, exit the second outlet of the first heat exchanger, and enter a liquid inlet of the evaporation tank,
    wherein the second inlet of the second heat exchanger is in communication with cooling water through a water inlet pipe, and the second heat exchanger is configured to allow the heat-exchanged cooling water to exit the second outlet of the second heat exchanger.

2. The system of claim 1, wherein a regulating valve is disposed on the water inlet pipe, a thermometer is disposed on the liquid inlet pipe, and the regulating valve and the thermometer are interlocked.

3. A method of reducing a content of 5-hydroxymethylfurfural in a high fructose syrup, comprising the following steps:
    at step 1, obtaining a glucose syrup by subjecting starch to liquefaction, saccharification and refining;
    at step 2, mixing the glucose syrup in step 1 with a raffinate in step 6 and concentrating the mixture to obtain a glucose syrup solution;
    at step 3, bringing the glucose syrup solution in step 2 into an isomerization column to obtain an F42 high fructose syrup;
    at step 4, decolorizing the F42 high fructose syrup in step 3 and then bringing the F42 high fructose syrup into an ion exchange positive column and an ion exchange negative column in sequence to remove cations and anions so as to obtain a refined F42 high fructose syrup;
    at step 5, concentrating the refined F42 high fructose syrup in step 4 to obtain a finished F42 high fructose syrup;
    at step 6, bringing about 42-50% of the finished F42 high fructose syrup in step 5 into chromatographic separation to obtain an F90 high fructose syrup extract liquid and a raffinate, wherein the raffinate is reused in step 2;
    at step 7, blending the F90 high fructose syrup extract liquid in step 6 with a part of the finished F42 high fructose syrup in step 5 to obtain an F55 high fructose syrup;

at step 8, decolorizing the F55 high fructose syrup in step 7 and then bringing the F55 high fructose syrup into a mixed bed column so as to obtain a refined F55 high fructose syrup; wherein, in order to increase a feed temperature, the F55 high fructose syrup is subject to heat exchange with a discharge of the mixed bed column and heat exchange with cooling water to obtain a heat-exchanged F55 high fructose syrup before the F55 high fructose syrup enters the mixed bed column;

at step 9, concentrating the refined F55 high fructose syrup in step 8 by evaporation to obtain a finished F55 high fructose syrup.

4. The method of claim 3, wherein in step 4, the refined F42 high fructose syrup has a fructose content of 42-45%.

5. The method of claim 3, wherein in step 4, the refined F42 high fructose syrup has a pH of 3.5-8.0 and a conductivity ≤30 μS/cm.

6. The method of claim 3, wherein in step 5, the finished F42 high fructose syrup has a refractive index of 58-60%.

7. The method of claim 3, wherein in step 7, the F55 high fructose syrup has a fructose content of 55-57%.

8. The method of claim 3, wherein in step 8, the heat-exchanged F55 high fructose syrup has a temperature of 35-38° C., a pH value of 4.0-7.0, a conductivity ≤20 μS/cm, and an IU≤10.

9. The method of claim 3, wherein in step 9, the finished F55 high fructose syrup has a solid content above 77%.

* * * * *